No. 793,970. PATENTED JULY 4, 1905.
H. WANNER.
OPTICAL PYROMETER.
APPLICATION FILED AUG. 26, 1904.

2 SHEETS—SHEET 1.

No. 793,970. PATENTED JULY 4, 1905.
H. WANNER.
OPTICAL PYROMETER.
APPLICATION FILED AUG. 26, 1904.

2 SHEETS—SHEET 2.

WITNESSES:
F. H. Schott
E. O. Hildebrand

INVENTOR
Henrich Wanner
BY Georgii Massie
his Attorneys.

No. 793,970. Patented July 4, 1905.

UNITED STATES PATENT OFFICE.

HEINRICH WANNER, OF WALDHAUSEN, NEAR HANOVER, GERMANY.

OPTICAL PYROMETER.

SPECIFICATION forming part of Letters Patent No. 793,970, dated July 4, 1905.

Application filed August 26, 1904. Serial No. 222,303.

*To all whom it may concern:*

Be it known that I, HEINRICH WANNER, head master, a citizen of the German Empire, residing at Waldhausen, near Hanover, Province of Hanover, Empire of Germany, have invented certain new and useful Improvements in Optical Pyrometers; and I do hereby declare the following to be a full, clear, and exact description of the invention, such as will enable others skilled in the art to which it appertains to make and use the same.

This invention relates to an optical pyrometer.

The object of my invention is to provide an optical pyrometer in which from a standard lamp of predetermined intensity an artificial field of light is produced whose intensity has a known relation to that of the standard lamp, said artificial field of light being made equal in intensity to that of the light from the incandescent body whose temperature is to be determined, this temperature being determined from suitable graduations which indicate the relation between the intensity of the artificial field of light and the intensity of the standard lamp.

With this general object in view an apparatus embodying my invention comprises a standard lamp, means for polarizing the light from said lamp, adjustable means for varying the intensity of the said polarized light, mechanism for indicating the adjustment of said adjustable means, and means for bringing the light from the incandescent body and the polarized light into juxtaposition.

Owing to the fact that lights of equal intensity from different sources may have different color values, which increases the difficulty of determining when the light from the incandescent body and the artificial field of light—viz., the polarized light—have the same intensity, my apparatus is also provided with means for giving the same color to both fields of light—viz., that from the incandescent body and the artificial field.

The preferred embodiment of my invention will now be described in connection with the accompanying drawings, in which—

Figure 1:
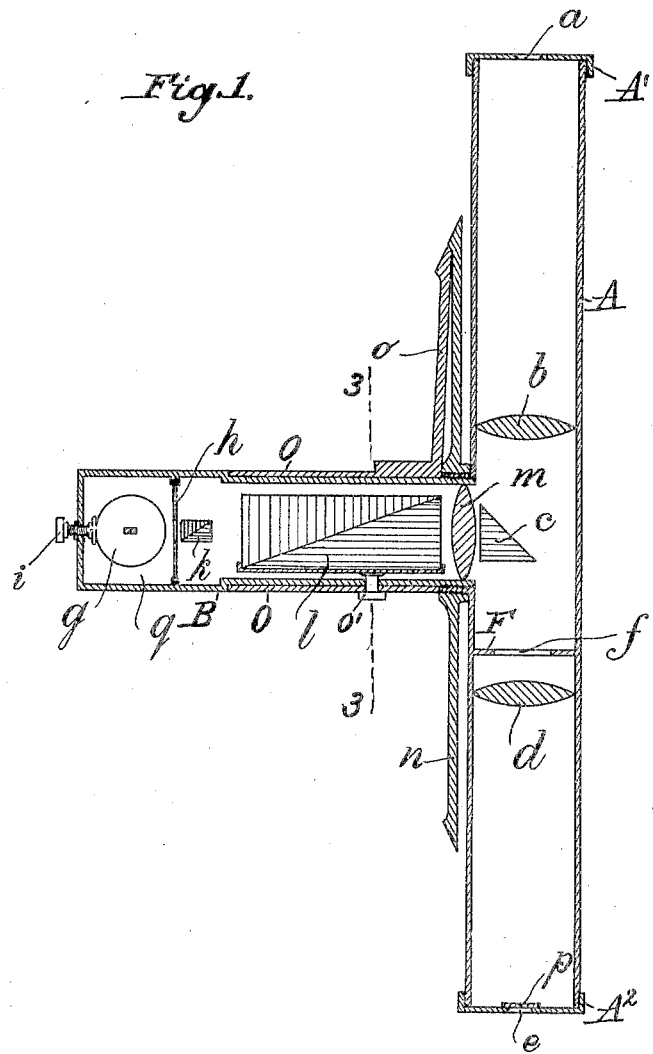
Figure 2:
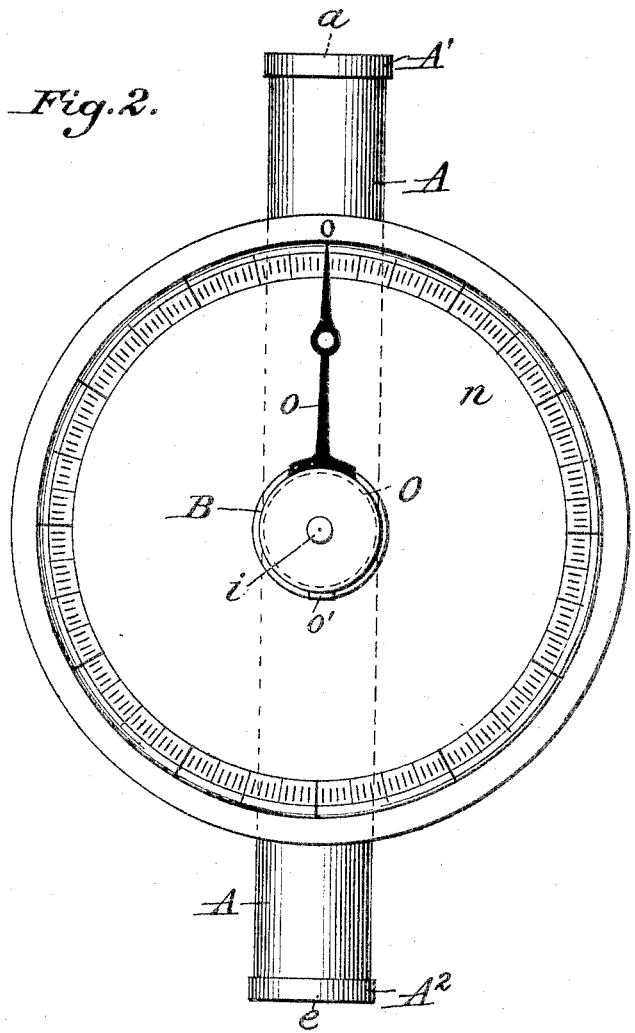
Figure 3:
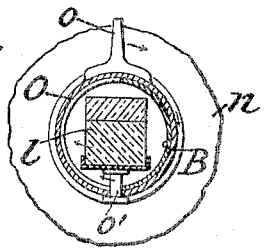

Figure 1 is a central sectional view of a pyrometer embodying my invention; Fig. 2, a side elevation; and Fig. 3, a section on the line 3 3, Fig. 1.

In these drawings, A is a sight-tube having both ends provided with caps A' A², the former of which has an aperture *a*, through which the light from the incandescent body enters the instrument. In the tube A is located a lens *b*, arranged to bring the rays from the incandescent body into parallelism.

F is a diaphragm having an opening *f*, and in front of this diaphragm is a lens *d*. The cap A² of the tube has an eye-opening *e*, which is covered by a plate of colored glass *p*, preferably red. At right angles to the tube A and opening into the same is a light-tube B, having its outer end closed. To the end of this tube B nearest the tube A is secured a dial *n*, having suitable graduations, as explained hereinafter. The tube B preferably is reduced in diameter beyond the dial *n* and is surrounded by an alidade tube or collar O, which carries an alidade or index *o* and is rotatable upon the lamp-tube B. In the lamp-tube is mounted a ground-glass plate *h*, and in the space *q* between said plate *h* and the outer end of the tube is placed a standard lamp *g*, which is movable toward and from said plate *h* by means of a screw *i*, whose head extends outside the lamp-tube. At *k* is indicated a suitable polarizing device consisting in the present instance of a Nicol's prism. The alidade collar or tube O is provided with a stud or pin *o'*, which extends inward through a slot in the wall of the lamp-tube B and carries means for modifying the polarized light from the polarizer *k*, this means consisting in the present case of an analyzer—such, for example, as the Nicol's prism *l*. At the inner end of the lamp-tube B is mounted a lens *m*, and in the sight-tube A opposite the lamp-tube there is located a total-reflection prism *c*.

The principle of operation of the apparatus is as follows: The light from the lamp *g* passing through the polarizer *k* is polarized, and when the analyzer *l* is in its proper zero position the said polarized light passes through said analyzer substantially unmodified and falls upon the lens *m*, which brings the rays of polarized light into parallelism and projects them upon the prism *c*, which reflects said rays into about one-half of the opening $f$ in the partition F, thereby producing an illuminated field covering about one-half of the said opening. By rotating the alidade-collar O the analyzer $l$ is rotated, thus modifying the intensity of the polarized light which falls upon the prism $c$ and as a result modifying the intensity of the field of light projected into the opening $f$. The alidade $o$ will indicate upon the dial $n$ the amount of rotation of the analyzer $l$. The alidade $o$ and dial $n$ are so adjusted with reference to each other that the zero-graduation of the dial will be indicated by the alidade when the analyzer is in the same relative position axially as the polarizer, as will be fully understood by those skilled in the art. In order to standardize the light, the analyzer is set in its zero position, and a known standard lamp, such as an amyl-acetate lamp, is placed opposite the opening $a$ of the sight-tube. The light from said known standard lamp passes through the lens $b$, and thereby its rays are brought into parallelism. One-half of said rays, or thereabout, travel past the prism $c$ and illuminate that half of the opening $f$ which is not illuminated by the polarized light. By examining the two fields of light in the opening $f$ by applying the eye to the opening $e$ it is possible to adjust the lamp $g$ of the instrument toward or from the glass plate $h$ by means of the screw $i$ until the two fields of light in the opening $f$ are of equal intensity. Upon this being done the lamp $g$ may be considered as standardized.

To use the apparatus for determining temperature, the incandescent body whose temperature is to be determined is viewed through the sight-tube A, the light from said incandescent body falling through the opening $a$ and the lens $b$ and forming a field of light in the opening $f$, while the polarized light also forms a field of light in said opening $f$, the two fields lying side by side or slightly overlapping— that is, lying in juxtaposition. By rotating the alidade-collar O, and thereby the analyzer $l$, the polarized light from the prism $k$ is suitably modified, so that the artificial field of light formed in the half of the opening $f$ is modified in intensity until it appears to the eye at $e$ of the same intensity as the field of light from the incandescent body. Upon this condition being attained the temperature of the incandescent body can be determined by reading the graduations upon the dial $n$, which preferably instead of being graduated in degrees of angle is marked with the different temperatures corresponding to the different angles of rotation of the analyzer $l$. By this means a direct reading of the temperature is possible. It will be observed that in this construction a standard source of light is employed and that from this polarized light is produced which can be modified in intensity by the adjustment of the analyzer and that in this way an artificial field of light is produced in juxtaposition to the field of light from the incandescent body, the said artificial field of polarized light being modified by the adjustment of the analyzer until it appears of equal intensity with the field of light from the incandescent body, whereupon the temperature can be read from the dial $n$.

Having thus fully described the invention, what I claim is—

1. In an optical pyrometer, the combination, with a source of polarized light of ascertainable intensity, and means for producing therefrom an artificial field of light whose intensity relative to that of the polarized light is known, of means for bringing into juxtaposition to said artificial field of light, a field of light from the incandescent body whose temperature is to be determined.

2. In an optical pyrometer, the combination, with a source of polarized light of ascertainable intensity, of adjustable means for modifying the intensity of said polarized light, mechanism for indicating the adjustment of said modifying means, and means for bringing a field of said polarized light into juxtaposition with a field of light from the incandescent body whose temperature is to be determined.

3. In an optical pyrometer, the combination with a standardized source of light, means for polarizing the same, and means for producing with said polarized light an artificial field of light, of an adjustable analyzer arranged to modify the intensity of said artificial field, means for indicating the adjustment of said analyzer and means for bringing a field of light from the incandescent body under examination into juxtaposition with the said artificial field of light.

4. In an optical pyrometer, the combination, with a polarizer and an analyzer, one of which is adjustable relative to the other, means for indicating the relative adjustment of the polarizer and analyzer, a source of light arranged to throw its light through the polarizer and analyzer, and means for bringing into juxtaposition a field of the polarized light and a field of light from the incandescent body to be examined.

In testimony whereof I affix my signature to this specification in the presence of two witnesses.

HEINRICH WANNER.

Witnesses:
LEONORE RASCH,
ANNA DIPPEL.